(12) United States Patent
Christensen et al.

(10) Patent No.: US 6,248,241 B1
(45) Date of Patent: Jun. 19, 2001

(54) PROCESS FOR THE REMOVAL OF DISSOLVED METALS AND/OR METALLOIDS FROM AN AQUEOUS MEDIUM CONTAINING SAME AND HAVING A HIGH CONTENT OF SALT

(75) Inventors: Terkel C. Christensen, Roskilde; Peter B. Nielsen, Farum, both of (DK)

(73) Assignee: Krüger A/S, Søborg (DK)

( * ) Notice: Subject to any disclaimer, the term of this patent is extended or adjusted under 35 U.S.C. 154(b) by 0 days.

(21) Appl. No.: 09/284,200

(22) PCT Filed: Oct. 9, 1997

(86) PCT No.: PCT/DK97/00437

§ 371 Date: Apr. 28, 1999

§ 102(e) Date: Apr. 28, 1999

(87) PCT Pub. No.: WO98/16476

PCT Pub. Date: Apr. 23, 1998

(30) Foreign Application Priority Data

Oct. 11, 1996 (DK) .......................................... 1123

(51) Int. Cl.[7] ..................................................... C02F 1/62
(52) U.S. Cl. .......................... 210/715; 210/721; 210/723; 210/724; 210/911; 210/912
(58) Field of Search ..................................... 210/702, 714, 210/715, 716, 717, 723, 912, 913, 721, 722, 724, 911

(56) References Cited

U.S. PATENT DOCUMENTS

| 1,990,214 | * | 2/1935 | Zapffe | 210/16 |
| 2,355,808 | * | 8/1944 | Laylor | 210/16 |
| 3,222,277 | * | 12/1965 | Joyce | 210/63 |
| 4,581,219 | * | 4/1986 | Imada et al. | 423/605 |
| 5,635,073 | * | 6/1997 | Aktoe et al. | 210/714 |

* cited by examiner

Primary Examiner—Peter A. Hruskoci
(74) Attorney, Agent, or Firm—Dykema Gossett PLLC

(57) ABSTRACT

A process for the removal of dissolved metals and/or metalloids from an aqueous medium having a high content of salt wherein the aqueous medium in the presence of manganese (II) ions and an oxidation agent is passed through a particulate carrier material having a specified density, initial average grain size and flow rate, so as to fluidize carrier material particles in the aqueous medium, and whereby the coated material particles thereby formed are separated from the aqueous medium.

7 Claims, 1 Drawing Sheet

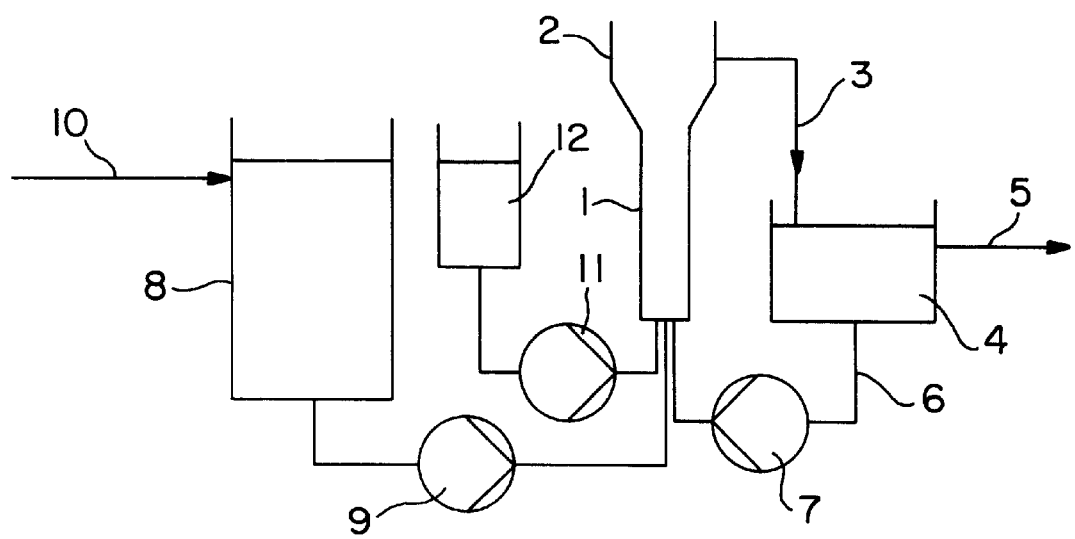

PROCESS FOR THE REMOVAL OF DISSOLVED METALS AND/OR METALLOIDS FROM AN AQUEOUS MEDIUM CONTAINING SAME AND HAVING A HIGH CONTENT OF SALT

BACKGROUND OF THE INVENTION

The present invention relates to a process for the removal of dissolved metals and/or metalloids, such as As, Cd, Zn, Cut V, Ni, Sr, Sn, Ag, Se, Ba and Pb, from an aqueous medium, such as waste water, containing same and having a high content of salts, such as sodium, calcium and magnesium chlorides and sulphates.

Waste water formed by purification of flue gases from power plants and refuse incineration plants and stemming from deposits of solid waste in marine environment as well as fillings typically contain one or more of the above salts in concentrations which far exceed official requirements on drinking water, as well as dissolved metals and metalloids.

It is known to remove such dissolved metals and metalloids from waste water by chemical precipitation, e.g., by sulphide or hydroxide precipitation, with formation of large amounts of sludge, the separation of which from the waste water is cumbersome and cost consuming.

EP application No. 93919050.0 discloses a process for the removal of dissolved metals and in particular heavy metals from aqueous media containing same by passing the aqueous medium through a layer of a particulate carrier material in the presence of ferro ions and an oxidation agent and at such conditions that the carrier material particles are fluidized in the aqueous medium. Hereby coatings of amorphous ferric oxyhydroxide/ferric hydroxide are formed on the surfaces of the carrier material particles, to which coatings the heavy metals are bound by adsorption.

V. Janda and L. Benŝová: "Removal of Manganese from Water in fluidized bed", Aqua, No. 16, pp. 313, 1988, discloses a process for the removal of Mn(II) from drinking water by oxidation with KMnO$_4$ so as to form a MnO$_2$ coating on the surface of the fluidized carrier material particles.

It is known, cf. e.g. T. C. Christensen and P. B. Nielsen: "Rensning af grundvand for tungmetaller", ATV-møde, Vintermøde om grundvandsforurening, Mar. 5–6, 1996, to combine a process for the removal of manganese(II) from drinking water as mentioned above with a removal of dissolved nickel.

Since drinking water normally only contains minor amounts of the salts mentioned in the preamble, the salts present in the drinking water will not interfere with the formation of a coating on the surfaces of the carrier material particles.

When removing dissolved metals and metalloids from aqueous media containing large amounts of salts, which herein should be taken to mean amounts of salt corresponding to salt concentrations for one or more of the salts of more than 1 g/l, the processes mentioned above are not readily applicable, since competition arises between the salts, e.g. sulphates, and the metals for the space necessary for the adsorption on the surfaces of the carrier material particles, which manifests itself in unsatisfactory removal of both manganese and dissolved metals and/or metalloids, On closer studies of the adsorption and flow conditions in connection with the fluidization of carrier material particles in an aqueous medium containing Mn(II) ions and an oxidation agent, it has turned out that by using a carrier material having a density within given limits and by adapting the concentration of Mn(II) ions to the average grain diameter of the carrier material at the start of the process and the flow rate of the aqueous medium, sufficient space is obtainable on the surfaces of the carrier material particles for the salts in the aqueous medium not to block adsorption of manganese as well as metals or metalloids on these surfaces, simultaneously with it being avoided that the coatings which are formed on the particles are knocked off as a consequence of the particles colliding with each other.

SUMMARY OF THE INVENTION

The process according to the invention is characterized in that the aqueous medium in the presence of manganese(II) ions and an oxidation agent are passed through a particulate carrier material having a density of 2–3.5 g/cm$^3$ and a maximum initial average grain size $d_{av.}$ in mm, which is $$d_{av.} = \frac{(1 - 0.053\, d_{av.} \cdot kMn(II))^{3.75}}{0.069 \cdot kMn(II)}$$

where kMn(II) denotes the concentration of Mn(II) in mg/l at the introduction into the particulate material, and a flow rate between $V_{min}$ and $V_{max}$ where $V_{min}$ is represented by 120 $d_{av.}^{1.5}$ and at least 4 m/h, and $V_{max}$ 300 $d_{av.}^{1.5}$, and maximally 47 m/h, so as to fluidize the carrier material particles in the aqueous medium, and that the coated carrier material particles thereby formed are separated from the aqueous medium.

At the contact between the aqueous medium containing the metals and/or the metalloids to be removed, the MN(II) ions and the oxidation agent as well as the carrier material particles, Mn(II) ions will be adsorbed on the surfaces of the last mentioned, and by reaction with the oxidation agent will form a coating of amorphous manganese(IV)oxide with simultaneous adsorption/deposition of metals and/or metalloids present, which are thereby removed from the aqueous medium.

Since the reactions mentioned take place while the carrier material particles are kept fluidized (suspended) in the aqueous medium, the surfaces of the carrier material particles will be in constant contact with new Mn(II) ions. Some of these will be adsorbed onto the manganese(IV)oxide coating formed, and will by reaction with the oxidation agent form an additional layer of manganese(IV)oxide and metals and/or metalloids, which process will proceed until the content of Mn(II) ions or oxidation agent in the aqueous medium has been consumed. The content of Mn(II)ions in the aqueous medium will be the restricting factor as the surface area of the carrier material particles due to the above-mentioned relationship between the concentration of Mn(II) ions and average particle size will be greater than necessary, so that the Mn(II)ions can be bound to the particle surfaces and thereby ensure an optimum formation of a coating of amorphous manganese(IV)oxide and metals and/or metalloids irrespective of the content of salt in the aqueous medium.

The unimpeded contact between the fluidized carrier material particles, the Mn(II)ions, oxidation agent and metals and/or metalloids entails that the carrier material particles unimpededly will be able to grow in all directions.

The coating on the carrier material particles is dense and strong and has a relatively high density. These properties combined with the increased dimensions of the coated particles entail that the particles can be separated relatively easily from the aqueous medium, and following separation take up only comparatively little space.

The density of the coating is primarily due to it being formed in a manner which is analogous with crystal growth, and not by particle collision (flocculation) which, as known, gives a relatively incoherent product.

By using the process according to the invention, the content of metals and metalloids can be reduced to a value which, as regards most metals and metalloids, is below the officially approved limits for permissible metal contents in water to be supplied to natural recipients. Thus, by purifying, e.g., nickel, cadmium or zinc containing water, more than 90% of the metal can be removed per treatment unit in series.

As mentioned, the aqueous medium is contacted with the carrier material particles in the presence of Mn(II) ions. Such ions will often be present in the water containing waste water, but if not, or if they are not present in suitably large amounts, they must be added to the waste water, preferably in the form of manganese sulphate of manganese chloride.

Examples of useful oxidation agents are potassium permanganate, oxygen, ozone, chlorine, chlorine oxides and dichromates, potassium permanganate being the preferred oxidation agent.

Examples of preferred carrier materials are inert materials, such as mineral grains, e.g. sand grains, fly ash and slag, but also other types of carrier materials, such as iron particles, are useful.

The average grain size of the carrier material particles at the start of the reaction is preferably between 0.05 and 0.5 mn, but depends, as mentioned, on the concentration of Mn(II) ions in the aqueous medium.

The instant reaction is preferably carried out at a pH-value of 4–8.5.

The separation of the coated carrier material particles can easily take place using traditional separation methods, e g. by decantation, centrifugation, filtration and the like, so as to a form a final product having a physical shape suited for further handling.

The process is particularly suited for the removal of arsenic, cadmium, zinc, nickel, strontium, tin, silver, selenium, copper, vanadium, barium and lead, but is also useful for the removal of other metals and metalloids.

In the following the invention is described in more detail with reference to the drawing which schematically illustrates a plant for carrying out a preferred embodiment of the process according to the invention.

BRIEF DESCRIPTION OF THE FIGURE

In the figure, 1 is a cylindrical reactor having an expanded upper part 2, which via an overflow pipe is connected with a recirculation tank 4, which is connected partly with a discharge pipe 5, and partly with a recirculation pipe 6, which via a pump 7 connects the recirculation tank 4 with the bottom of the reactor 1.

The bottom of the reactor 1 is via a raw water tank 8 and a pump 9 connected with a supply pipe 10 for raw water and is via an additional pump 11 connected with a tank 12 for oxidation agent in the form of a potassium permanganate solution.

The mode of operation in the plant shown is as follows:

Raw water, which is introduced through the supply pipe 10, is by means of the pump 9 pumped in at the bottom of the reactor 1, which contains particles of an inert carrier material. At the same time, oxidation agent is supplied at the bottom of the tank from the tank 12 by means of the pump 11.

The flow of water introduced at the bottom of the reactor 1 evokes a fluidization (suspending) of the carrier material particles.

In the reactor 1, as a result of the presence of MN(II) ions in the raw water, coatings consisting of amorphous manganese(IV)oxide and metals and/or metalloids, deriving from the raw water, will be formed on the surface of the carrier material particles, whereby the raw water is freed of the said metals and/or metalloids. The water thus treated leaves the reactor 1 at its top 2, and is passed to the recirculation tank 4 from which it may either be passed to discharge through the discharge pipe 5, or be recirculated to the bottom of the reactor 1 through the recirculation pipe.

When the carrier material particles have obtained a suitable size, the coated particles are withdrawn from the reactor 1.

In the following the process according to the invention will be described in more detail with reference to the example below.

EXAMPLE

Waste water formed by purification of flue gas from a combined heat and power plant by a wet desulphurization process under formation of gypsum was centrifuged in order to remove gypsum and subjected to a treatment with a precipitating agent and succeeding sedimentation, whereafter some of the waste water was fed as raw water into a plant as shown in the drawing.

The content of salts, metals and metalloids in the waste water as well as its pH and temperature appear from table 1 below.

TABLE 1

| | |
|---|---|
| Calcium | 8.9 g/l |
| Magnesium | 1.9 g/l |
| Sodium | 0.4 g/l |
| Chloride | 20 g/l |
| Sulphate | 1.1 g/l |
| Zinc | 1.5–2 mg/l |
| Cadmium | 0.6–0.8 mg/l |
| Selenium | 0.6–0.8 mg/l |
| Mercury | 0.17 mg/l |
| Nickel | 0.5–0.7 mg/l |
| Manganese | 40–100 mg/l |
| Molybdenum | 0.07 mg/l |
| Arsenic | <0.01 mg/l |
| pH | 6.7–7.3 |
| Temperature | 30–40° C. |

In its lower part the reactor used had an inner diameter of 145 mm and a total length of 5.5 m.

Waste water, recirculated purified water and dissolved potassium permanganate were introduced at the bottom of the reactor containing sand with an average grain diameter of 0.18 as carrier material. In addition, sodium hydroxide was added for pH-adjustment, as required.

Manganese(II) already present in the waste water was used as reducing agent, whereby further dosage of manganese(II) was unnecessary. 30–35 l/h of waste water containing 70–90 mg/l of Mn(II), which by recirculation were reduced to 10–16 mg/l, and potassium permanganate solution corresponding to a Mn(II)/KMnO$_4$ mole ratio of 1.2–1.5, were introduced, and the supply rate was varied between 14 and 19 m/h.

Continuous experiments with constant parameters were carried out over a period of time of minimally 24 hours, before samples for analyses were taken out.

The removal of metals from the waste water appears from table 2.

TABLE 2

| Parameter | | Experiment 1 | Experiment 2 | Experiment 3 |
|---|---|---|---|---|
| Supply rate | m/h | 14 | 17 | 19 |
| pH (reactor bottom) | — | 8.4 | 7.2 | 8.8 |
| Manganese | | | | |
| total inlet* | mg/l | 79 | 79 | 87 |
| total outlet | mg/l | 9 | 8 | 16 |
| dissolved outlet | mg/l | 0.2 | 0.2 | 0.1 |
| total purification | % | 89 | 90 | 82 |
| dissolved purification | % | 99.7 | 99.8 | 99.9 |
| Nickel (aq) | | | | |
| inlet | μg/l | 510 | 510 | 640 |
| outlet | μg/l | 3 | 7 | 2 |
| purification | % | 99.4 | 98.6 | 99.7 |
| Cadmium (aq) | | | | |
| inlet | μg/l | 640 | 640 | 730 |
| outlet | μg/l | 27 | 53 | 20 |
| purification | % | 95.8 | 91.7 | 97.3 |
| Zinc (aq) | | | | |
| inlet | μg/l | 1900 | 1900 | 1600 |
| outlet | μg/l | 75 | 50 | 200 |
| purification | % | 96.1 | 97.4 | 87.5 |
| Arsenic (aq) | | | | |
| inlet | μg/l | 2.9 | 2.9 | 2.6 |
| outlet | μg/l | 2.2 | 1.3 | 2.3 |
| purification | % | 24 | 55 | 12 |

*Manganese and the metals in the inlet are exclusively present in dissolved form As appears from table 2, a very good removal of manganese, nickel, cadmium and zinc was obtained in the three experiments The low concentration of arsenic restricts the removal of this metalloid. It is seen that at increasing pH, the removal of nickel and cadmium is increased, whereas at decreasing pH, the removal of zinc, arsenic and manganese is increased.

What is claimed is:

1. A process for the removal of dissolved metals selected from the group consisting of Ag, Ba, Cd, Ni, Pb, Sn, Sr, Zn, and V, and metalloids selected from the group consisting of As and Se, from an aqueous medium containing same and having salt concentrations of more than 1 g/l comprising the steps of (a) passing the aqueous medium through a particulate carrier material having a density of 2–3.5 g/cm$^3$ and a maximum average grain size $d_{av}$ in mm at the start of the process which is determined by iteration based on the formula:

$$d_{av} = \frac{(1 - 0.053 \, d_{av} \cdot kMn(II))^{3.75}}{0.069 \cdot kMn(II)}$$

where kMn (II) denotes the concentration of MN(II) in mg/l at the introduction into the particulate material, and at a flow rate in m/h between $V_{min}$ and $V_{max}$, where $V_{min}$ is represented by $120 \, d_{av}^{1.5}$ and at least 4 m/h, and $V_{max}$ is represented by $300 \, d_{av}^{1.5}$ and maximally 47 m/h in the presence of a sufficient amount of manganese (II) ions and oxidation agent to allow the dissolved metals and metalloids to form a coating on the carrier particles, so as to fluidize and coat carrier material particles in the aqueous medium, and (b) separating the coated carrier material particles from the aqueous medium.

2. A process according to claim 1, including prior to step (b) adding supplementary amounts of Mn(II) ions in the form of manganese sulphate or manganese chloride to the aqueous medium.

3. A process according to claim 1 wherein the oxidation agent is potassium permanganate.

4. A process according to claim 1, wherein said particulate carrier material comprises inert particles of sand, fly ash or slag.

5. A process according to claim 4, wherein said carrier material particles have an average size between 0.05 and 0.5 mm.

6. A process according to claim 1, wherein step (a) is carried out at a pH of 4–8.5.

7. A process according to claim 1, wherein step (b) is carried out by sedimentation, centrifugation or filtration.

* * * * *